US010397430B2

(12) United States Patent
Ikuno

(10) Patent No.: US 10,397,430 B2
(45) Date of Patent: Aug. 27, 2019

(54) INFORMATION PROCESSING APPARATUS THAT INSTALLS APPLICATION MODULES, CONTROL METHOD THEREFOR, AND STORAGE MEDIUM

(71) Applicant: CANON KABUSHIKI KAISHA, Tokyo (JP)

(72) Inventor: Takao Ikuno, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/687,752

(22) Filed: Aug. 28, 2017

(65) Prior Publication Data
US 2018/0084130 A1 Mar. 22, 2018

(30) Foreign Application Priority Data
Sep. 20, 2016 (JP) .................................. 2016-183257

(51) Int. Cl.
*G06F 3/12* (2006.01)
*H04N 1/00* (2006.01)
(52) U.S. Cl.
CPC ..... *H04N 1/00938* (2013.01); *H04N 1/00973* (2013.01); *H04N 2201/0094* (2013.01)
(58) Field of Classification Search
CPC .... G06F 3/1225; G06F 3/1203; G06F 3/1236; G06F 3/1284; H04N 1/00411; H04N 1/00464; H04N 1/00938; H04N 1/00973; H04N 2201/0094
USPC ................................................. 358/1.1–1.18
See application file for complete search history.

(56) References Cited

U.S. PATENT DOCUMENTS

| | | | | |
|---|---|---|---|---|
| 2010/0241965 A1* | 9/2010 | Ishii | ..................... | G06Q 10/107 715/739 |
| 2011/0041144 A1* | 2/2011 | Araki | ..................... | G06F 9/541 719/328 |
| 2015/0099502 A1* | 4/2015 | Park | ....................... | H04W 4/16 455/418 |
| 2015/0180955 A1* | 6/2015 | Nakagawara | ........... | H04L 67/10 709/223 |
| 2015/0355871 A1* | 12/2015 | Nakata | .................. | G06F 3/1285 358/1.15 |
| 2017/0371686 A1* | 12/2017 | Shiotani | .................. | G06F 9/451 |

FOREIGN PATENT DOCUMENTS

JP 2005153218 A 6/2005

* cited by examiner

*Primary Examiner* — Gabriel I Garcia
(74) *Attorney, Agent, or Firm* — Rossi, Kimms & McDowell LLP

(57) ABSTRACT

An information processing apparatus which is capable of running appropriately an application corresponding to designated URL information. An operating unit receives an instruction to perform installation of an additional application different from an installed application. A CPU obtains URL information on the additional application and determines whether or not the URL information on the additional application corresponds to URL information on the installed application. In a case where the URL information on the additional application corresponds to the URL information on the installed application, one of the additional application and the installed application is set to an enabled state.

7 Claims, 8 Drawing Sheets

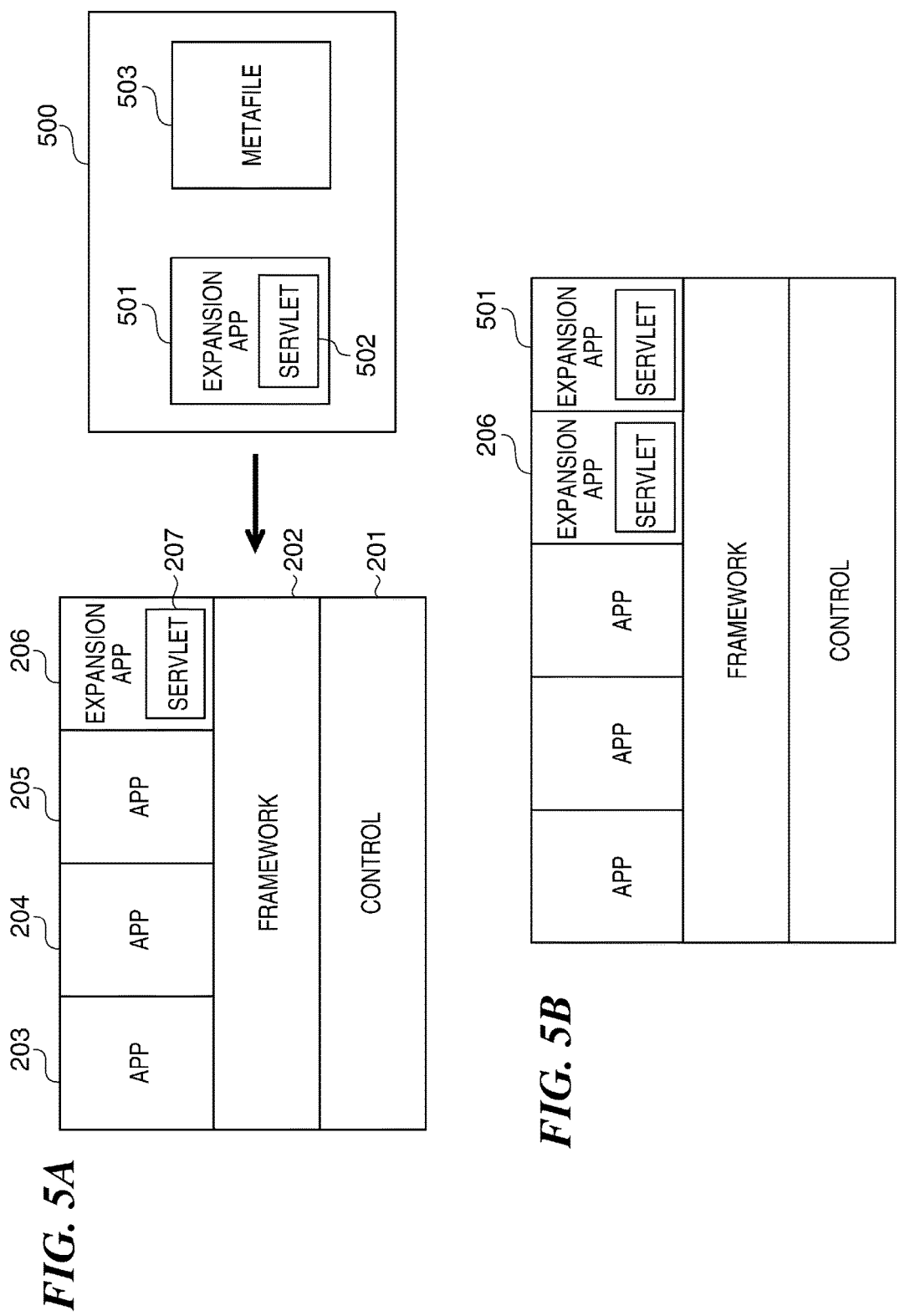

INFORMATION PROCESSING APPARATUS THAT INSTALLS APPLICATION MODULES, CONTROL METHOD THEREFOR, AND STORAGE MEDIUM

BACKGROUND OF THE INVENTION

Field of the Invention

The present invention relates to an information processing apparatus, a control method therefor, and a storage medium.

Description of the Related Art

An MFP (multi function printer) which is an information processing apparatus capable of expanding functionality by installing therein new application modules (hereafter referred to merely as "apps") is known. In the MFP, for example, apps which submit such jobs as printing and faxing to a control module incorporated in advance in the MFP are installed (see, for example, Japanese Laid-Open Patent Publication (Kokai) No. 2005-153218). In the MFP, an app that performs a WSD (Web service discovery) function of detecting a specific apparatus via a network (hereafter referred to as an "WSD app") may be installed as well. By running the installed WSD app in response to an access from an external apparatus connected to a plurality of apparatuses including the MFP via the network, the MFP is detected as an apparatus capable of performing a specific function, for example, a printing function from among the plurality of apparatuses by the external apparatus.

In the MFP, different pieces of URL information are associated with installed apps. In the MFP, only an app corresponding to a piece of the URL information designated by the external apparatus among the installed apps runs in accordance with operating instructions from the external apparatus.

However, with the conventional MFP, there may be cases where an app corresponding to URL information designated by the external apparatus cannot be run in accordance with operating instructions from the external apparatus. For example, it is prescribed in advance for the MFP that only one piece of URL information is allowed to be associated with the WSD app among plural pieces of URL information available to the MFP. For this reason, when an additional WSD app different from a WSD app that has already been installed is newly installed in the MFP, the same URL information is associated with these WSD apps. When this URL information is designated by the external apparatus, the MFP cannot identify which of the WSD apps which is to be run between the two WSD apps and therefore cannot run appropriately the WSD app corresponding to the designated URL information.

SUMMARY OF THE INVENTION

The present invention provides an information processing apparatus and a control method therefor which are capable of running appropriately an application corresponding to designated URL information, as well as a storage medium.

Accordingly, an aspect of the present invention provides an information processing apparatus that executes an installed application in accordance with designation of URL information on the installed application, comprising a receiving unit configured to receive an instruction to perform installation of an additional application different from the installed application, an obtaining unit configured to obtain URL information on the additional application, a determination unit configured to determine whether the URL information on the additional application corresponds to URL information on the installed application, and a setting unit configured to, in a case where the URL information on the additional application corresponds to the URL information on the installed application, set one of the additional application and the installed application to an enabled state.

According to the aspect of the present invention, it is possible to run appropriately an application corresponding to designated URL information.

Further features of the present invention will become apparent from the following description of exemplary embodiments (with reference to the attached drawings).

BRIEF DESCRIPTION OF THE DRAWINGS

FIGS. 5A and 5B are views useful in explaining how expansion apps are installed in the MFP in FIG. 1.

DESCRIPTION OF THE EMBODIMENTS

Hereafter, an embodiment of the present invention will be described in detail with reference to the drawings.

In the following description of the present embodiment, it is assumed that the present invention is applied to an MFP which is an information processing apparatus, but the present invention should not necessarily be applied to the MFP but may be applied to any apparatus which is capable of newly installing an app.

Figure 1:
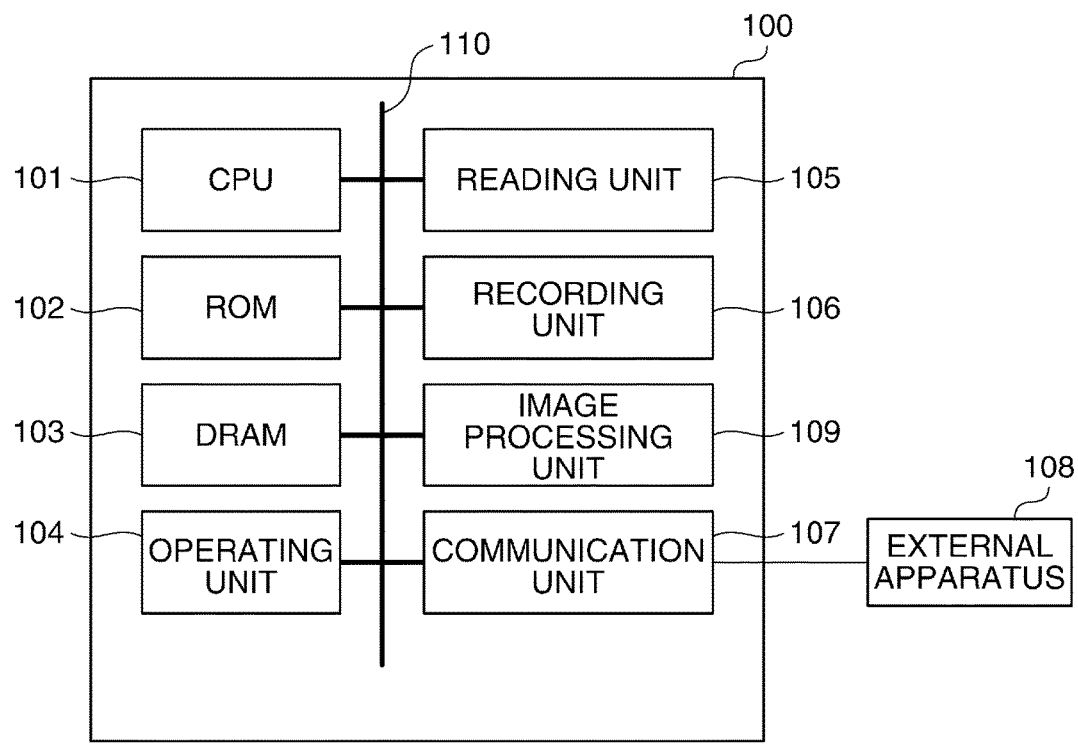
FIG. 1 is a block diagram schematically showing an arrangement of an MFP which is an information processing apparatus according to an embodiment of the present invention.

FIG. 1 is a block diagram schematically showing an arrangement of an MFP 100 which is the information processing apparatus according to the embodiment of the present invention.

Referring to FIG. 1, the MFP 100 has a CPU 101, a ROM 102, a DRAM 103, an operating unit 104 (which is an example of a receiving unit and a setting change receiving unit), a reading unit 105, a recording unit 106, a communication unit 107, and an image processing unit 109. The CPU 101, the ROM 102, the DRAM 103, the operating unit 104, the reading unit 105, the recording unit 106, the communication unit 107, and the image processing unit 109 are connected to one another via a system bus 110.

The MFP 100 is pre-equipped with functions of executing such jobs as a printing process and a scanning process. The MFP 100 is also able to install application modules (hereafter referred to as "expansion apps") that expand functionality. The CPU 101 centrally controls the entire MFP 100 and carries out processes of software modules 200 in FIG. 2, to be described later. The ROM 102 is a flash memory such as an eMMC (embedded Multi Media Card) and stores programs, which are to be executed by the CPU 101, and a variety of setting data. For example, the ROM 102 stores programs that execute installed expansion apps. The DRAM 103 is a volatile memory and used as a work area for the CPU 101. The DRAM 103 is also used as a temporary storage area for a variety of data. The operating unit 104 is a user interface of the MFP 100 and receives input information input by a user such as an instruction to execute a job. The reading unit 105 reads an image of an original placed on an original platen glass, not shown, provided in the MFP 100, obtains image information on the original, and generates image data based on the image information. The recording unit 106 performs printing on a sheet based on the image data generated by the reading unit 105. The communication unit 107 controls data communications with apparatuses such as an external apparatus 108 which are connected to the MFP 100 via a network, not shown. The image processing unit 109 subjects image data to an encoding-decoding process when sending and receiving the image data to and from the external apparatus 108.

Figure 2:
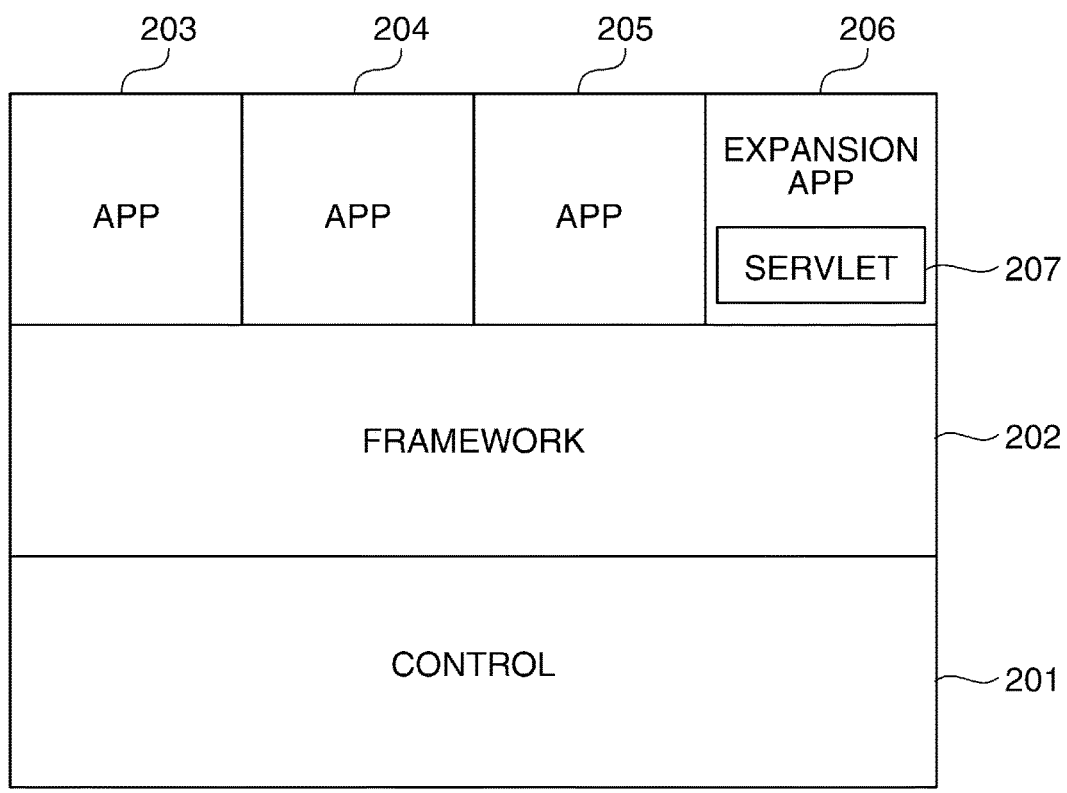
FIG. 2 is a block diagram schematically showing an arrangement of software modules of the MFP in FIG. 1.

FIG. 2 is a block diagram schematically showing an arrangement of the software modules 200 of the MFP 100 in FIG. 1.

Referring to FIG. 2, the software modules 200 include a control module 201, a framework module 202, apps 203 to 205, and an expansion app 206. The processes of the software modules 200 are carried out by the CPU 101 executing programs stored in the ROM 102.

The control module 201 controls operations of the MFP 100 and sends and receives notifications about execution of jobs in the MFP 100 to and from the apps 203 to 205 and the expansion app 206 via the framework module 202. The framework module 202 is an interpreter of the MFP 100 and interprets programs described in scripting languages to run the apps 203 to 205 and the expansion app 206. The framework module 202 also controls passing of notifications between the control module 201 and the apps 203 to 205 and the expansion app 206. The apps 203 to 205 are preinstalled in the MFP 100 and perform a variety of functions such as a printing function, a scanning function, and a data communicating function. The expansion app 206 has a Servlet module 207, which is not a preinstalled module like the apps 203 to 205 but is a module newly installed in accordance with an instruction from the user. The expansion app 206 performs a function of expanding functionality of the MFP 100. In the present embodiment, the expansion app 206 is an app (WSD app) which performs a WSD function of detecting a specific device via a network, not shown. The expansion app 206 runs in accordance with operating instructions issued from the operating unit 104 or operating instructions issued by an apparatus that has designated URL information on the expansion app 206, for example, the external apparatus 108. The URL information on the expansion app 206 is comprised of an MFP identifying section, which is a character string indicative of the MFP 100, and an app identifying section, which is a character string indicative of the Servlet module 207 of the expansion app 206. Address information or the like on the MFP 100 is set in the MFP identifying section. A predetermined character string defined in advance by the standards for the WSD functions is set in the app identifying section. The Servlet module 207 runs the expansion app 206 in accordance with operating instructions from the external apparatus 108. It should be noted that in the description of present embodiment, to explain the present embodiment easily, it is assumed that among the apps 203 to 205 and the expansion app 206, only the expansion app 206 has the Servlet module, but the apps 203 to 205 as well may have the Servlet module. For an app equipped with the Servlet module among the apps 203 to 205, URL information indicating the app is set as with the expansion app 206 described above.

Figure 3:
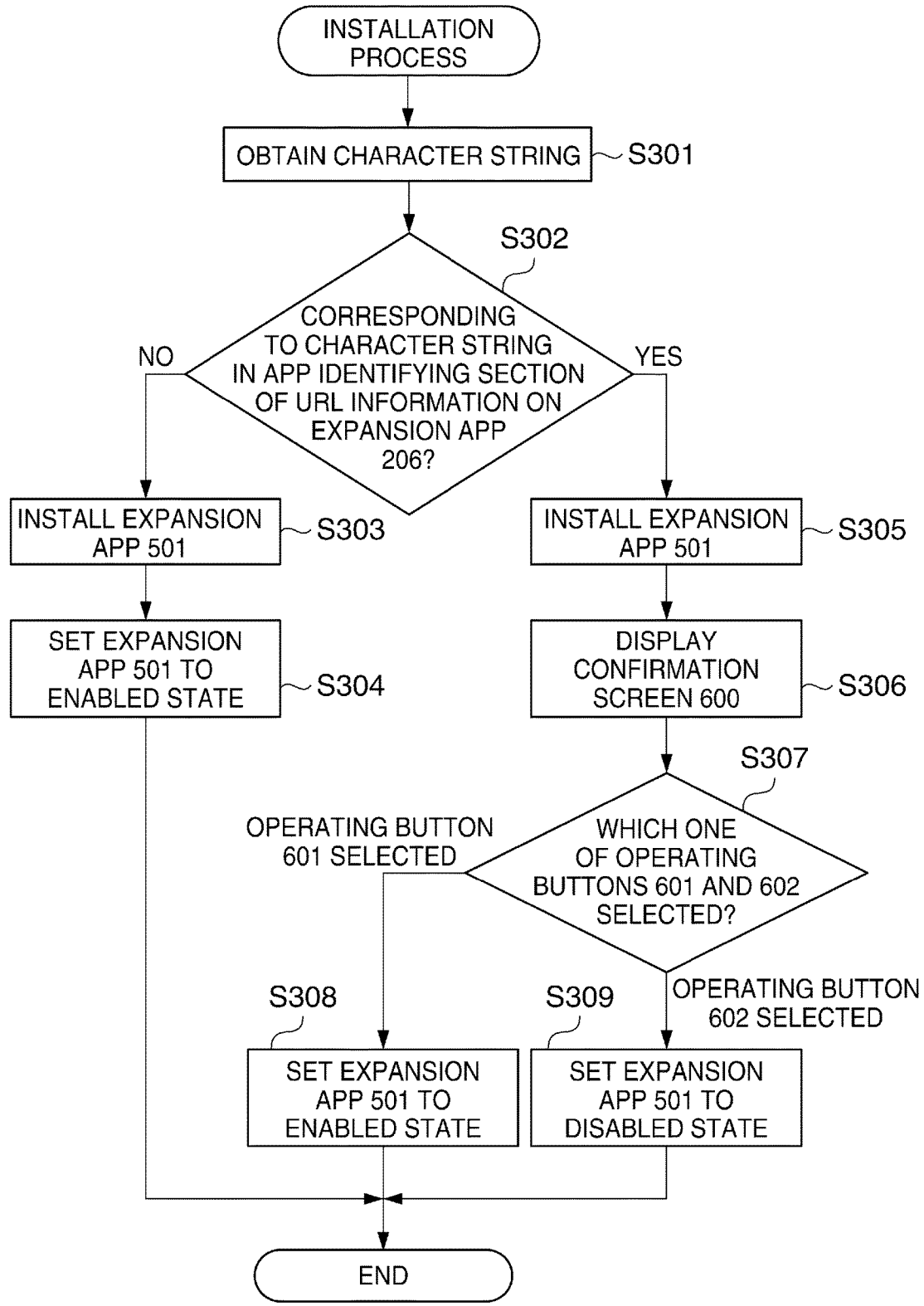
FIG. 3 is a flowchart showing the procedure of an installation process which is carried out by the MFP in FIG. 1.

FIG. 3 is a flowchart showing the procedure of an installation process which is carried out by the MFP 100 in FIG. 1.

Figure 4:
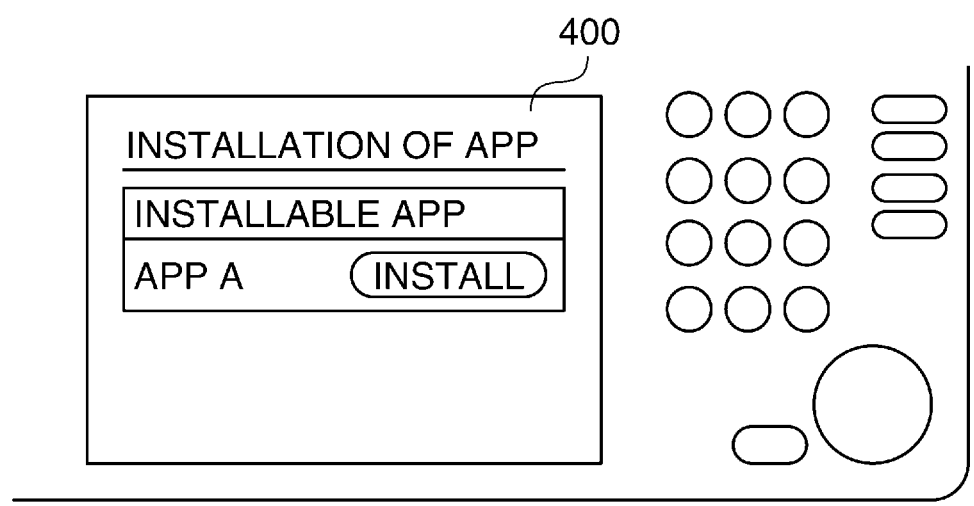
FIG. 4 is a view showing an exemplary setting screen which is displayed on an operating unit in FIG. 1.

The process in FIG. 3 is carried out by the CPU 101 executing programs stored in the ROM 102. The process in FIG. 3 is based on the assumption that the expansion app 206 that has already been installed is set to an enabled state. The process in FIG. 3 is also based on the assumption that an instruction to perform installation has been given by the user operating on a setting screen 400 in FIG. 4 displayed on the operating unit 104, and the communication unit 107 of the MFP 100 has received installation data 500 in FIG. 5A. The installation data 500 includes an expansion app 501 and a metafile 503. The expansion app 501 has a Servlet module 502 and is a WSD app different from the expansion app 206. The expansion app 501 runs in accordance with operating instructions from the operating unit 104 or operating instructions from an apparatus that has designated URL information on the expansion app 501, for example, the external apparatus 108. The metal file 503 includes information on the expansion app 501, for example, a character string which is set in an app identifying section of the URL information on the expansion app 501.

Since the expansion app 501 is the WSD app, not a unique character string such as a name of the expansion app 501 but a predetermined character string defined in advance by the standards for the WSD functions is set in the app identifying section of the URL information on the expansion app 501. For this reason, if as shown in FIG. 5B, the expansion app 501 different from the expansion app 206 which is the WSD app is newly installed in the MFP 100 in which the expansion app 206 has already been installed, the same character string as the one set in the URL information on the expansion app 206 would be set in the URL information on the expansion app 501 as well. If the URL information with this character string is designated by the external apparatus 108, the MFP 100 cannot identify which one of the expansion apps 206 and 501 is to be run, and thus cannot run appropriately an expansion app corresponding to the designated URL information.

To address this problem, in the present embodiment, when the URL information on the expansion app 501 that is newly installed corresponds to the URL information on the expansion app 206 that has already been installed, only one of the expansion apps 206 and 501 is set to the enabled state.

Referring to FIG. 3, first, the CPU 101 obtains the character string set in the app identifying section of the URL information on the expansion app 501 from the metafile 503 included in the installation data 500 received by the communication unit 107 (step S301). Next, the CPU 101 determines whether or not the obtained character string corresponds to URL information on any of apps for which URL information has been set in the MFP 100. Specifically, the CPU 101 determines whether or not the obtained character string corresponds to the character string in the app identifying section of the URL information on the expansion app 206 for which the URL information has been set in the MFP 100 (step S302). It should be noted that in the present embodiment, when there is a plurality of apps for which URL information has been set in the MFP 100 other than the expansion app 206, the CPU 101 may determine in the step S302 whether or not the obtained character string corresponds to character strings in app identifying sections of URL information on the respective apps for which the URL information has been set.

As a result of the determination in the step S302, when the obtained character string does not correspond to the character string in the app identifying section of the URL information on the expansion app 206, the CPU 101 installs the expansion app 501 (step S303). Then, the CPU 101 sets the expansion app 501 to the enabled state (step S304) and ends the present process.

Figure 6A:
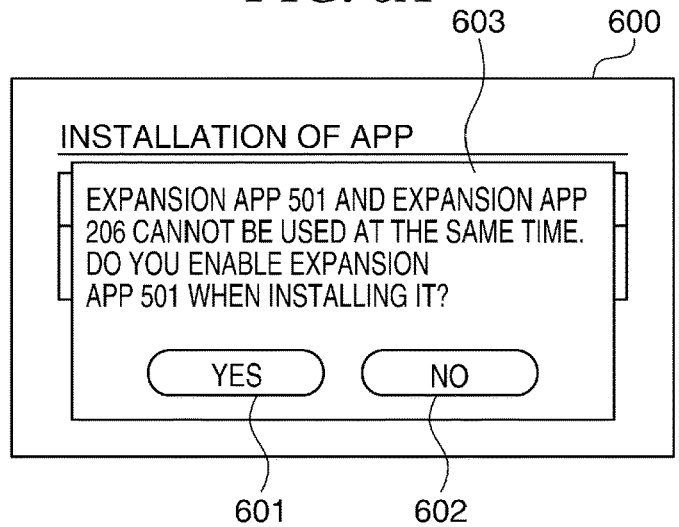
FIGS. 6A to 6C are views showing exemplary confirmation screens which are displayed on the operating unit in FIG. 1.

As a result of the determination in the step S302, when the obtained character string corresponds to the character string in the app identifying section of the URL information on the expansion app 206, the CPU 101 installs the expansion app 501 (step S305). Then, the CPU 101 displays, on the operating unit 104, a confirmation screen 600 in FIG. 6A prompting the user as to whether or not to set the expansion app 501 to the enabled state (step S306). The confirmation screen 600 has operating buttons 601 and 602 and a warning message 603. The operating button 601 receives an instruction to set the expansion app 501 to an enabled state, whereas the operating button 602 receives an instruction to set the expansion app 501 to a disabled state. As the warning message 603, a warning about installation of the expansion app 501 is displayed, and for example, when the expansion app 501 is installed, a message saying that the expansion app 501 and the already-installed expansion app 206 cannot be used at the same time is displayed.

The CPU 101 then determines which one of the operating buttons 601 and 602 has been selected on the confirmation screen 600 (step S307).

Figure 6B:

As a result of the determination in the step S307, when the operating button 601 has been selected, the CPU 101 sets the expansion app 501 of the expansion apps 206 and 501 to the enabled state (step S308). Specifically, the CPU 101 changes the setting on the expansion app 206 from the enabled state to the disabled state and also sets the expansion app 501 to the enabled state. After that, the CPU 101 displays, on the operating unit 104, a confirmation screen 604 in FIG. 6B indicating that the setting on the expansion app 206 has been changed from the enabled state to the disabled state as well as it is possible to change the settings on the expansion apps 206 and 501 later, and ends the present process.

Figure 6C:
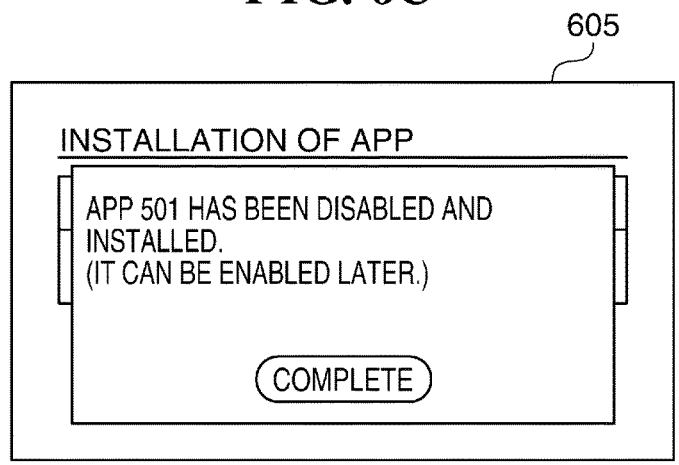

As a result of the determination in the step S307, when the operating button 602 has been selected, the CPU 101 to set the expansion app 501 to the disabled state (step S309). After that, the CPU 101 displays, on the operating unit 104, a confirmation screen 605 in FIG. 6C indicating that the expansion app 501 has been installed in the disable state as well as it is possible to change the settings on the expansion apps 206 and 501 later, and ends the present process.

According to the process in FIG. 3 described above, when the URL information on the expansion app 501 that is newly installed corresponds to the URL information on the expansion app 206 that has already been installed, only one of the expansion apps 206 and 501 is set to the enabled state. Namely, in the MFP 100, both the expansion apps 206 and 501 with the same URL information are never set to the enabled state at the same time. This eliminates the need for identifying an expansion app to be run from the expansion apps 206 and 501 with the same URL information, and hence it is thus possible to run appropriately an expansion app corresponding to designated URL information.

Moreover, in the process in FIG. 3 described above, when the URL information on the expansion app 501 corresponds to the URL information on the expansion app 206, a warning about installation of the expansion app 501 is issued. This informs the user a risk involved in installing the expansion app 501.

Furthermore, in the process in FIG. 3 described above, when the URL information on the expansion app 501 corresponds to the URL information on the expansion app 206, the user is prompted to choose whether or not to set the expansion app 501 to the enabled state. This reflects intent of the user on settings as to operation of the expansion app 501.

In the process in FIG. 3 described above, when the operating button 602 has been selected, the expansion app 501 is installed in the disabled state. As a result, the expansion app 501 is installed without hindering operation of the expansion app 206 corresponding to the designated URL information.

Moreover, in the process in FIG. 3 described above, whether or not the URL information on the expansion app 501 corresponds to the URL information on the expansion app 206 is determined based on the metafile 503 included in the installation data 500. As a result, whether or not the URL information on the expansion app 501 corresponds to the URL information on the expansion app 206 is reliably determined without the need to specially manage a character string corresponding to the app identifying section of the URL information on the expansion app 501.

Furthermore, in the process in FIG. 3 described above, URL information includes a predetermined character string defined in advance by the standards for the WSD functions. It is thus possible to reliably run an expansion app corresponding to designated URL information even when the same URL information is set for a plurality of expansion apps since character strings unique to the expansion apps cannot be set in app identifying sections.

Although the present invention has been described by way of the embodiment, the present invention is not limited to the embodiment described above.

For example, instructions on changes to settings on the respective expansion apps 206 and 501 may be received after the process in FIG. 3 is completed.

Figure 7:
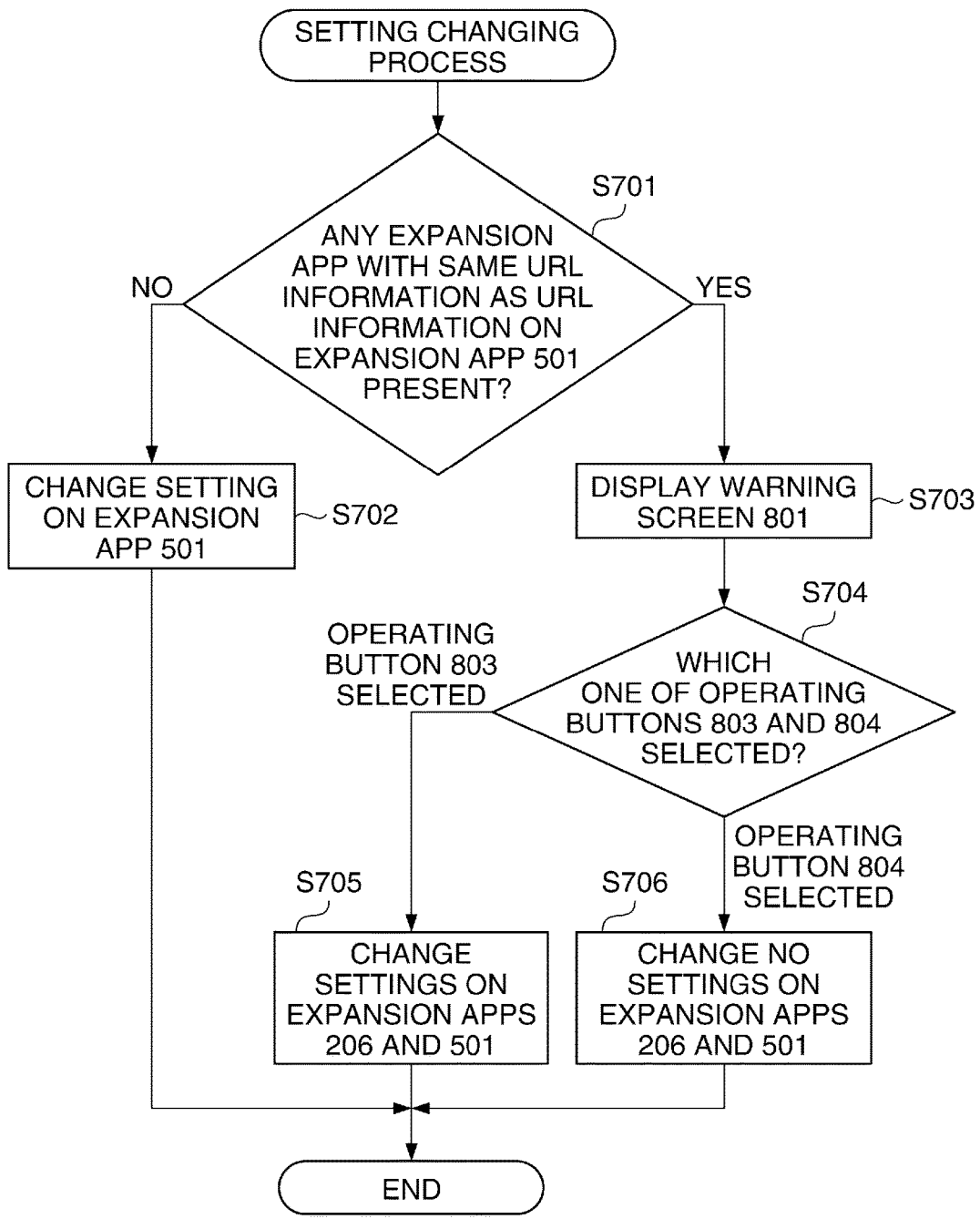
FIG. 7 is a flowchart showing the procedure of a setting changing process which is carried out by the MFP in FIG. 1.

FIG. 7 is a flowchart showing the procedure of a setting changing process which is carried out by the MFP 100 in FIG. 1.

Figure 8A:
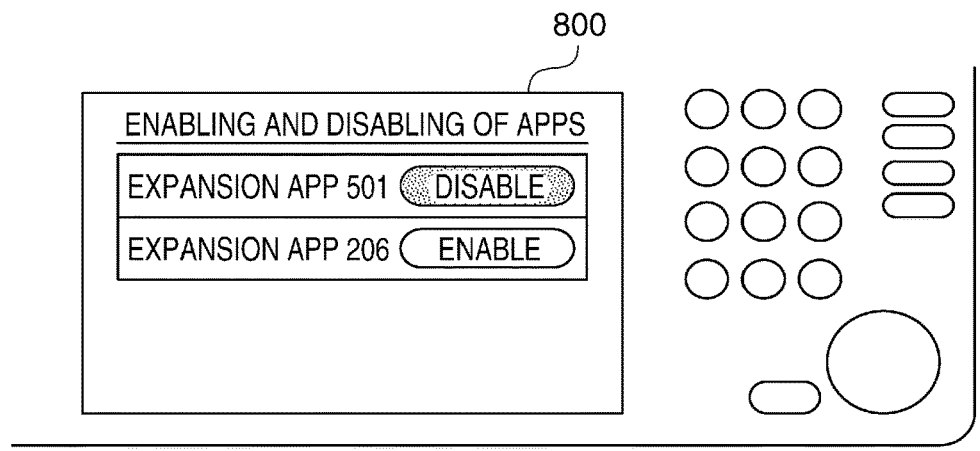
FIGS. 8A to 8C are views showing exemplary screens which are displayed on the operating unit in FIG. 1.

The process in FIG. 7 is carried out by the CPU 101 executing programs stored in the ROM 102. The process in FIG. 7 is based on the assumption that operation of the expansion app 206 is set to the enabled state, and the expansion app 501 is set to the disabled state. The process in FIG. 7 is also based on the assumption that a setting screen 800 in FIG. 8A which receives instructions on changes to settings on the respective expansion apps 206 and 501 is displayed on the operating unit 104, and for example, the user gives an instruction to change a setting on the expansion app 501 from the disabled state to the enabled state.

Referring to FIG. 7, first, the CPU 101 determines whether or not in the MFP 100, there is any expansion app for which the same URL information as the URL information on the expansion app 501 has been set (step S701).

As a result of the determination in the step S702, when there is no expansion app with the same URL information as the URL information on the expansion app 501, the CPU 101 changes the setting on the expansion app 501 from the disabled state to the enabled state (step S702) and ends the present process.

Figure 8B:
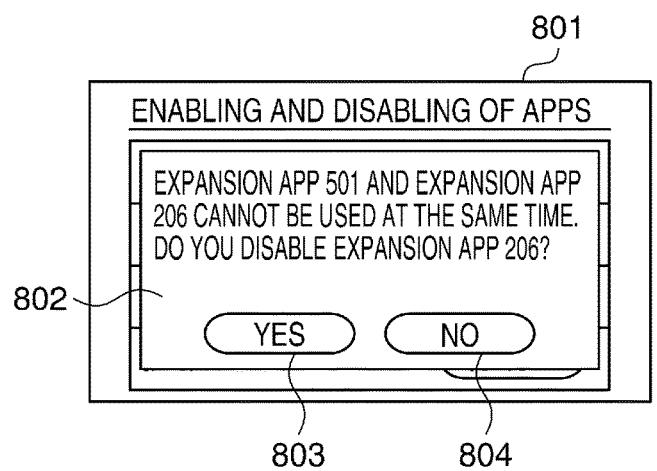

As a result of the determination in the step S702, when there is an expansion app, for example, the expansion app 206, with the same URL information as the URL information on the expansion app 501, the CPU 101 displays a warning screen 801 in FIG. 8B on the operating unit 104 (step 703). The warning screen 801 has a message 802 and operating buttons 803 and 804. As the message 802, a message asking whether or not to change the setting on the expansion app 206 with the same URL information as the URL information on the expansion app 501 is displayed. The operating button 803 receives an instruction to change the setting on the expansion app 206, and the operating button 804 receives an instruction not to change the setting on the expansion app 206. The CPU 101 then determines which one of the operating buttons 803 and 804 has been selected (step S704).

Figure 8C:
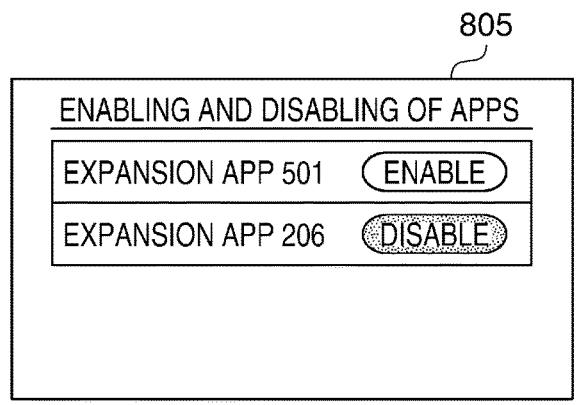

As a result of the determination in the step S704, when the operating button 803 has been selected, the CPU 101 changes the settings on the respective expansion apps 206 and 501 (step S705). Specifically, the CPU 101 changes the setting on the expansion app 206 from the enabled state to the disabled state and also changes the setting on the expansion app 501 from the disabled state to the enabled state. After that, the CPU 101 displays, on the operating unit 104, a setting screen 805 in FIG. 8C which reflects the change to the setting in the step S705. On the setting screen 805, the expansion app 206 is set to the disabled state, and the expansion app 501 is set to the enabled state. After that, the CPU 101 ends the present process.

As a result of the determination in the step S704, when the operating button 804 has been selected, the CPU 101 ends the present process without changing the settings on the respective expansion apps 206 and 501 (step S706).

In the process in FIG. 7 described above, since the instructions on changes to settings on the respective expansion apps 206 and 501 are received, it is possible to easily change the settings on operation of the respective expansion apps 206 and 501 in response to needs of the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This app claims the benefit of Japanese Patent App No. 2016-183257, filed Sep. 20, 2016, which is hereby incorporated by reference herein in its entirety.

What is claimed is:

1. An information processing apparatus that executes an installed application in accordance with associated URL information for the installed application, comprising:
   a memory configured to store instructions; and
   a processor configured to execute the stored instructions to:
      receive an instruction to perform installation of an additional application, the additional application being different from the installed application on the information processing apparatus;
      install the additional application according to the received instruction;
      determine whether associated URL information for the additional application corresponds to associated URL information for the installed application; and
      in a case where the associated URL information for the additional application corresponds to the associated URL information for the installed application:
         display a screen for prompting a user to select an application to be set to an enabled state from among applications including the additional application and the installed application;
         receive a selection of an application set to the enabled state via the screen;
         set the selected application to an enabled state; and
         set an application not selected via the screen to a disabled state.

2. An information processing apparatus according to claim 1, wherein the processor is further configured to execute the stored instructions to, in the case where the associated URL information for the additional application corresponds to the associated URL information for the installed application, display a warning about installation of the additional application.

3. An information processing apparatus according to claim 1, wherein the processor is further configured to execute the stored instructions to receive another instruction to change which of the additional application and the installed application should be enabled.

4. An information processing apparatus according to claim 1,
   wherein data including a character string that identifies the additional application and is set in the associated URL information for the additional application is obtained, and
   wherein, based on the obtained data, the processor executes the stored instructions to determine whether the associated URL information for the additional application corresponds to the associated URL information for the installed application.

5. An information processing apparatus according to claim 1,
   wherein the information processing apparatus is connected to an external apparatus, and
   wherein, the URL information includes a predetermined character string for the external apparatus to detect an apparatus that performs a specific function from among a plurality of apparatuses including the information processing apparatus connected to the external apparatus.

6. A control method for an information processing apparatus that executes an installed application in accordance with associated URL information for the installed application, comprising:
receiving an instruction to perform installation of an additional application, the additional application being different from the installed application on the information processing apparatus;
installing the additional application according to the received instruction;
determining whether associated URL information for the additional application corresponds to associated URL information for the installed application; and,
in a case where the associated URL information for the additional application corresponds to the associated URL information for the installed application:
displaying a screen for prompting a user to select an application to be set to an enabled state from among applications including the additional application and the installed application;
receiving a selection of an application set to the enabled state via the screen;
setting the selected application to an enabled state; and
setting an application not selected via the screen to a disabled state.

7. A non-transitory computer-readable storage medium storing a program for causing a computer to execute a control method for an information processing apparatus that executes an installed application in accordance with associated URL information for the installed application, the control method for the information processing apparatus comprising:
receiving an instruction to perform installation of an additional application, the additional application being different from the installed application on the information processing apparatus;
installing the additional application according to the received instruction;
determining whether associated URL information for the additional application corresponds to associated URL information for the installed application; and,
in a case where the associated URL information for the additional application corresponds to the associated URL information for the installed application:
displaying a screen for prompting a user to select an application to be set to an enabled state from among applications including the additional application and the installed application;
receiving a selection of an application set to the enabled state via the screen;
setting the selected application to an enabled state; and
setting an application not selected via the screen to a disabled state.

* * * * *